(12) United States Patent
Ajima

(10) Patent No.: US 7,889,725 B2
(45) Date of Patent: Feb. 15, 2011

(54) COMPUTER CLUSTER

(75) Inventor: Yuichiro Ajima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 302 days.

(21) Appl. No.: 11/728,645

(22) Filed: Mar. 27, 2007

(65) Prior Publication Data

US 2008/0089329 A1    Apr. 17, 2008

(30) Foreign Application Priority Data

Oct. 16, 2006    (JP)    ............... 2006-281703

(51) Int. Cl.
H04L 12/28    (2006.01)
H04L 12/56    (2006.01)
G06E 1/00    (2006.01)
G06F 15/00    (2006.01)
G06F 15/76    (2006.01)
G06F 15/177    (2006.01)
G06F 15/173    (2006.01)

(52) U.S. Cl. .................... 370/386; 706/29; 712/10; 712/11; 712/12; 370/400; 709/220; 709/238

(58) Field of Classification Search ............... 370/389, 370/254, 400–409, 386; 709/220, 249–253, 709/238; 706/26, 27, 29; 712/10–12
See application file for complete search history.

(56) References Cited

U.S. PATENT DOCUMENTS

| | | | | |
|---|---|---|---|---|
| 5,842,034 A | * | 11/1998 | Bolstad et al. | 712/11 |
| 2002/0116503 A1 | * | 8/2002 | Kamiya | 709/227 |
| 2003/0135621 A1 | * | 7/2003 | Romagnoli | 709/226 |
| 2005/0207755 A1 | * | 9/2005 | Rabbat et al. | 398/59 |
| 2005/0251567 A1 | * | 11/2005 | Ballew et al. | 709/223 |
| 2006/0176888 A1 | * | 8/2006 | McNamara | 370/401 |
| 2006/0291387 A1 | * | 12/2006 | Kimura et al. | 370/230 |
| 2008/0104367 A1 | * | 5/2008 | Blumrich et al. | 712/11 |
| 2010/0229020 A1 | * | 9/2010 | Doerr et al. | 713/600 |

FOREIGN PATENT DOCUMENTS

| | | |
|---|---|---|
| JP | 06-035873 | 2/1994 |
| JP | 07-191947 | 7/1995 |

* cited by examiner

*Primary Examiner*—Alpus H Hsu
*Assistant Examiner*—Saad Hassan
(74) *Attorney, Agent, or Firm*—Greer, Burns & Crain, Ltd.

(57) ABSTRACT

A computer cluster arranged at a lattice point in a lattice-like interconnection network contains four nodes and an internal communication network. Two nodes can transmit packets to adjacent computer clusters located along the X direction, and the two other nodes can transmit packets to adjacent computer clusters located along the Y direction. Each node directly transmits a packet to an adjacent computer cluster in the direction in which the node can transmit packets, when the destination of the packet is located in the direction. When the destination of a packet to be transmitted from a node is not located in the direction in which the receiving node can transmit packets, the node transfers the packet to one of the other nodes through the internal communication network for transmitting the packet to the destination of the packet through the one of the other nodes.

7 Claims, 15 Drawing Sheets

| Destination Address | | Destination | |
|---|---|---|---|
| Itself | (0, 0, 0) | From Output Circuit 113 | Discard |
| | | From Other Element Than Output Circuit 113 | Input Circuit 112 |
| In Cluster | (0, 0, 1) | Transmission Circuit 117a | |
| | (0, 0, 2) | Transmission Circuit 117b | |
| | (0, 0, 3) | Transmission Circuit 117c | |
| Direction of Increasing X | (1, *, *) | Transmission Circuit 115 | |
| Direction of Decreasing X | (2, *, *) | Transmission Circuit 117b | |
| Direction of Increasing Y | (0, 1, *) | Transmission Circuit 117a | |
| Direction of Decreasing Y | (0, 2, *) | Transmission Circuit 117c | |

FIG. 6

| Destination Address | | Destination | |
|---|---|---|---|
| Itself | (0, 0, 0) | From Output Circuit 213 | Discard |
| | | From Other Element Than Output Circuit 213 | Input Circuit 212 |
| In Cluster | (0, 0, 1) | Transmission Circuit 217 → PC Server 220 | |
| | (0, 0, 2) | Transmission Circuit 217 → PC Server 230 | |
| | (0, 0, 3) | Transmission Circuit 217 → PC Server 240 | |
| | (0, 0, 4) | Transmission Circuit 217 → PC Server 250 | |
| | (0, 0, 5) | Transmission Circuit 217 → PC Server 260 | |
| Direction of Increasing X | (1, *, *) | Transmission Circuit 215a | |
| Direction of Decreasing X | (2, *, *) | Transmission Circuit 215b | |
| Y-axis Directions | (0, 1, *) (0, 2, *) | Transmission Circuit 217 → PC Server 220 | |

FIG. 10

| Destination Address | | Destination | |
|---|---|---|---|
| Itself | (0, 0, 0, 0) | From Output Circuit 313 | Discard |
| | | From Other Element Than Output Circuit 313 | Input Circuit 312 |
| In Cluster | (0, 0, 0, 1) | Transmission Circuit 317a | |
| | (0, 0, 0, 2) | Transmission Circuit 317b | |
| | (0, 0, 0, 3) | Transmission Circuit 317c | |
| | (0, 0, 0, 4) | Transmission Circuit 317d | |
| | (0, 0, 0, 5) | Transmission Circuit 317e | |
| | (0, 0, 0, 6) | Transmission Circuit 317f | |
| | (0, 0, 0, 7) | Transmission Circuit 317g | |
| | (0, 0, 0, 8) | Transmission Circuit 317h | |
| Direction of Increasing X | (1, *, *, *) \| (8, *, *, *) | Transmission Circuit 315a | |
| Direction of Decreasing X | (9, *, *, *) \| (15, *, *, *) | Transmission Circuit 315b | |
| Y-axis Directions | (0, 1, *, *) \| (0, 15, *, *) | Transmission Circuit 317c | |
| Z-axis Directions | (0, 0, 1, *) \| (0, 0, 15, *) | Transmission Circuit 317f | |

FIG. 14

COMPUTER CLUSTER

CROSS-REFERENCE TO RELATED APPLICATIONS

This application is based upon and claims the benefits of priority from the prior Japanese Patent Application No. 2006-281703, filed on Oct. 16, 2006, the entire contents of which are incorporated herein by reference.

BACKGROUND OF THE INVENTION (1) Field of the Invention

The present invention relates to a computer cluster which has a plurality of nodes, and is to be arranged at each lattice point in an interconnection network having a lattice-like structure.

(2) Description of the Related Art

Recently, the computing performance of the processors has been dramatically improved with the development of the hardware technology. However, currently, some types of processing such as large-scale calculations for science and engineering, massive multimedia data processing, and the like still require computing performance which is much higher than the computing performance of a single processor. In addition, the parallel processing techniques for operating multiple processors in parallel are known. In order to perform parallel processing, an interconnection network in which a plurality of nodes each having a processor and a communication device are mutually linked is constructed. In the interconnection network, data processing proceeds while transmitting packets between the nodes. The interconnection network may be the all-to-all-connection (fully-connected) type, the tree type, the star type, the ring type, the mesh type, the torus type, the hypercube type, or the like.

In the case where the interconnection network contains a great number of nodes, the interconnection network of the mesh type or the torus type is used in many cases in order to suppress increase in the number of links. In the interconnection network of the mesh type or the torus type, the nodes are arranged in a lattice, and packets are relayed through one or more nodes to a destination node. However, in the case where a great number of nodes are interconnected in an interconnection network having a lattice-like structure, the number of nodes arrayed along each direction in the lattice is great, i.e., the number of relay operations which are performed until each packet reaches a destination node is great.

In some techniques proposed for solving the above problem, for example, as disclosed in Japanese Unexamined Patent Publications Nos. 06-35873 and 7-191947, the interconnection network is hierarchized. Specifically, a computer cluster having a plurality of nodes, instead of a single node, is arranged at each lattice point in the interconnection network. In each computer cluster, the plurality of nodes are interconnected so as to form a network of a ring type, a torus type, a hypercube type, or the like. When the interconnection network is hierarchized as above, the average number of operations of relaying a packet can be suppressed, so that the computing performance of the entire system can be improved.

However, according to the techniques disclosed in Japanese Unexamined Patent Publications Nos. 06-35873 and 7-191947, when the operation speed of the processors increases, the packet transfer in each computer cluster causes a bottleneck of the computing performance of the entire system. That is, since each packet is relayed through nodes even in each computer cluster, the relay overhead and the transmission capacity of each link connecting nodes can limit improvement of the computing performance.

On the other hand, if an auxiliary link or switch device is provided in each computer cluster in order to decrease the number of relay operations in each computer cluster, the structure of the computer cluster becomes asymmetric. The relay operation in each node is performed in accordance with an identical rule in an interconnection network having a simple lattice-like structure. However, in the case where the auxiliary link or switch device is provided in each computer cluster, the rule for relaying packets differs depending on nodes, so that the circuitry for realizing the interconnection network becomes complex.

SUMMARY OF THE INVENTION

The present invention is made in view of the above problems, and an object of the present invention is to provide a computer cluster which is to be arranged at each lattice point in an interconnection network having a lattice-like structure, has a symmetric internal structure, and reduces the number of operations of relaying a packet.

In order to accomplish the above object, a computer cluster for use as one of a plurality of components of a computer system performing data processing by transmitting packets between the plurality of components is provided, where the plurality of components are arranged at a plurality of lattice points in an interconnection network having a lattice-like structure, each of the packets contains a destination address constituted by an external address indicating a position of one of the plurality of lattice points and an internal address indicating a relative position in one of the plurality of components, and the interconnection network includes a plurality of first subnetworks each of which connects ones of the plurality of components arrayed along a line parallel to a first axis of the lattice-like structure, a plurality of second subnetworks each of which connects ones of the plurality of components arrayed along a line parallel to a second axis of the lattice-like structure, a plurality of third subnetworks each of which connects ones of the plurality of components arrayed along a line parallel to the first axis of the lattice-like structure, and a plurality of fourth subnetworks each of which connects ones of the plurality of components arrayed along a line parallel to the second axis of the lattice-like structure. The computer cluster comprises first, second, third, and fourth nodes and an internal communication network. Each of the first, second, third, and fourth nodes includes, a processor which performs processing of packets, a first communication unit which transmits packets to one of a plurality of components other than the computer cluster and receives packets from one of a plurality of components other than the computer cluster, a second communication unit which transmits packets to a node in the computer cluster and receives packets from a node in the computer cluster, and a switch unit which is connected with the processor, the first communication unit, and the second communication unit, acquires packets from the processor, the first communication unit, and the second communication unit, and performs switching of the acquired packets so as to transfer each of the acquired packets to the processor when the acquired packet contains an internal address indicating the node, transfer the acquired packet to the first communication unit when the acquired packet does not contain an external address corresponding to the computer cluster and a direction in which the acquired packet is to be transmitted corresponds to a direction in which the first communication unit can transmit a packet, and transfer the acquired packet to the second communication unit when the acquired packet contains the external address corresponding to the computer cluster and does not contain an internal address indicating the node or when the acquired packet does not contain an external address corresponding to the computer cluster and the direction in which the acquired packet is to be transmitted does not correspond to the direction in which the first communication unit can transmit a packet. The internal communication network interconnects the first, second, third, and fourth nodes at the second communication unit. The first communication unit in the first node is connected through one of the plurality of first subnetworks with a first pair of components located adjacent to the computer cluster on both sides of the computer cluster along a direction parallel to the first axis, the first communication unit in the second node is connected through one of the plurality of second subnetworks with a second pair of components located adjacent to the computer cluster on both sides of the computer cluster along a direction parallel to the second axis, the first communication unit in the third node is connected through one of the plurality of third subnetworks with the first pair of components located adjacent to the computer cluster on both sides of the computer cluster along the direction parallel to the first axis, and the first communication unit in the fourth node is connected through one of the plurality of fourth subnetworks with the second pair of components located adjacent to the computer cluster on both sides of the computer cluster along the direction parallel to the second axis.

The above and other objects, features and advantages of the present invention will become apparent from the following description when taken in conjunction with the accompanying drawings which illustrate preferred embodiment of the present invention by way of example.

BRIEF DESCRIPTION OF THE DRAWINGS

FIG. 6 is a diagram indicating a rule for determining a destination from a switch circuit in a processing unit according to the first embodiment of the present invention.

FIG. 10 is a diagram indicating a rule for determining a destination from a switch circuit in a PC server according to the second embodiment of the present invention.

FIG. 14 is a diagram indicating a rule for determining a destination from a switch circuit in a processing unit according to the third embodiment of the present invention.

DESCRIPTION OF THE PREFERRED EMBODIMENTS

Preferred embodiments of the present invention will be explained below with reference to the accompanying drawings. First, an outline of the present invention which is realized in the embodiments is indicated, and thereafter details of the embodiments are explained.

Outline of the Invention

Figure 1:
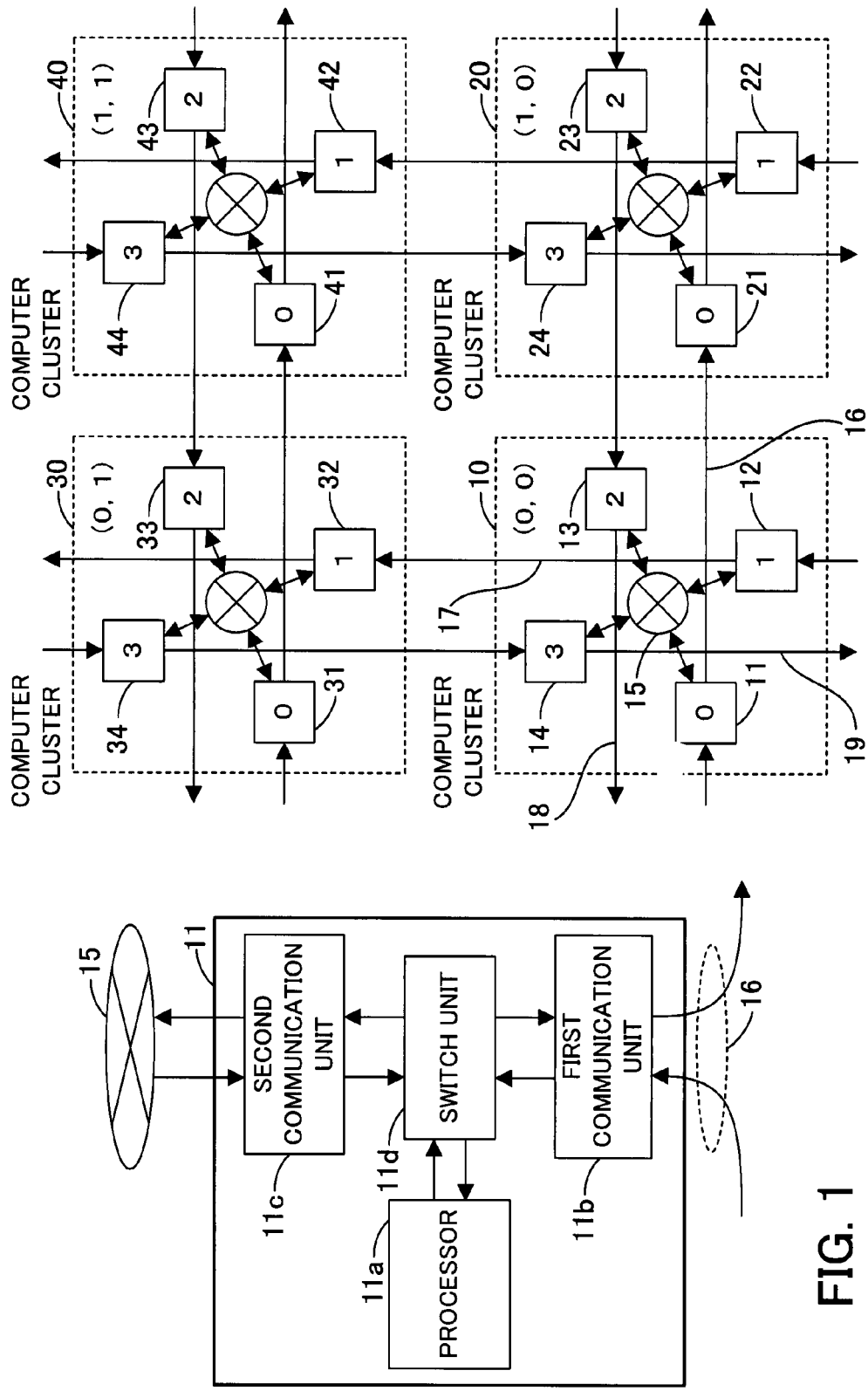
FIG. 1 is a diagram illustrating a parallel processing system in which computer clusters according to the present invention are arranged.

FIG. 1 is a diagram illustrating a parallel processing system in which the computer clusters according to the present invention are arranged. FIG. 1 is provided for explaining an outline of the present invention. In the parallel processing system of FIG. 1, a computer cluster containing a plurality of nodes is arranged at each of a plurality of lattice points in an interconnection network having a two-dimensional torus structure. That is, the parallel processing system of FIG. 1 is realized by a hierarchical interconnection network. The two-dimensional torus structure can be realized by connecting the cluster servers located at each pair of opposite lattice points (which are located at opposite edges along a line parallel to the X or Y axis) of an interconnection network having a mesh structure so as to form a loop.

The parallel processing system of FIG. 1 comprises computer clusters 10, 20, 30, and 40, which are respectively located at the lattice points with the coordinates (0, 0), (1, 0), (0, 1), and (1, 1), and the computer clusters arranged at the adjacent lattice points are linked.

Since the computer clusters 10, 20, 30, and 40 have similar constructions as illustrated in FIG. 1, the construction and the operations of only the computer cluster 10 are explained below.

The computer cluster 10 contains first to fourth nodes 11, 12, 13, and 14 and an internal communication network 15, and the first to fourth nodes 11, 12, 13, and 14 are respectively connected with first to fourth external communication networks 16, 17, 18, and 19. Each of the first to fourth nodes 11, 12, 13, and 14 has the functions of data processing and transmission and reception of packets. The packets received by and/or transmitted from each of the first to fourth nodes 11, 12, 13, and 14 can be transferred through the internal communication network 15 to another of the first to fourth nodes 11, 12, 13, and 14.

The first external communication network 16 transmits to the first node 11 a packet transmitted from a computer cluster (not shown) located adjacent to the computer cluster 10 on the smaller X-coordinate side, and transmits a packet from the first node 11 to the computer cluster 20 located adjacent to the computer cluster 10 on the greater X-coordinate side. The second external communication network 17 transmits to the second node 12 a packet transmitted from the computer cluster (not shown) located adjacent to the computer cluster 10 on the smaller Y-coordinate side, and transmits a packet from the second node 12 to the computer cluster 30 located adjacent to the computer cluster 10 on the greater Y-coordinate side.

The third external communication network 18 transmits to the third node 13 a packet transmitted from the computer cluster 20 located adjacent to the computer cluster 10 on the greater X-coordinate side, and transmits a packet from the third node 13 to the computer cluster (not shown) located adjacent to the computer cluster 10 on the smaller X-coordinate side. The fourth external communication network 19 transmits to the fourth node 14 a packet transmitted from a computer cluster 30 located adjacent to the computer cluster 10 on the greater Y-coordinate side, and transmits a packet from the fourth node 14 to a computer cluster (not shown) located adjacent to the computer cluster 10 on the smaller Y-coordinate side.

Since the first to fourth nodes 11, 12, 13, and 14 have similar constructions, the construction and the operations of only the first node 11 are explained below. The first node 11 contains a processor 11a, a first communication unit 11b, a second communication unit 11c, and a switch unit 11d.

The processor 11a executes a designated program, and receives and outputs a packet when necessary. Each packet outputted from the processor 11a contains a destination address constituted by an external address and an internal address. The external address indicates the coordinates of a lattice point, and the internal address indicates the position of the node (i.e., the first node 11 in this case) in the computer cluster (i.e., the computer cluster 10 in this case).

The first communication unit 11b transmits a packet to and receives a packet from a device outside the computer cluster 10 through the first external communication network 16. Specifically, when the first communication unit 11b receives a packet from the outside of the computer cluster 10, the first communication unit 11b outputs the received packet to the switch unit 11d. When the first communication unit 11b acquires a packet from the switch unit 11d, the first communication unit 11b transmits the acquired packet to the outside of the computer cluster 10.

The second communication unit 11c transmits a packet to and receives a packet from another node inside the computer cluster 10 through the internal communication network 15. Specifically, when the second communication unit 11c receives a packet from one of the second node 12, the third node 13, and the fourth node 14, the second communication unit 11c outputs the received packet to the switch unit 11d. When the second communication unit 11c acquires a packet from the switch unit 11d, the second communication unit 11c transmits the acquired packet to one of the second node 12, the third node 13, and the fourth node 14 according to the destination address contained in the acquired packet.

The switch unit 11d acquires packets outputted from the processor 11a, the first communication unit 11b, and the second communication unit 11c, extracts the destination address from each of the acquired packets, determines the destination (from the switch unit 11d) of the packet according to the destination address, and outputs the packet to the determined destination. Specifically, when the destination address of the packet coincides with the address of the first node 11, the switch unit 11d determines the processor 11a to be the destination of the packet. When the destination address of the packet coincides with the address of one of the second node 12, the third node 13, and the fourth node 14, the switch unit 11d determines the second communication unit 11c to be the destination of the packet. When the destination address of the packet is different from the address of the first node 11 and the direction in which the packet is to be transmitted corresponds to the direction in which the first communication unit 11b can transmit packets, the switch unit 11d determines the first communication unit 11b to be the destination of the packet. When the destination address of the packet is different from the address of one of the first node 11 and the direction in which the packet is to be transmitted does not correspond to the direction in which the first communication unit 11b can transmit packets, the switch unit 11d determines the second communication unit 11c to be the destination of the packet.

In the computer cluster 10 having the above construction, the first node 11 relays packets which are transmitted through the first external communication network 16 in the direction of increasing the X coordinate, the second node 12 relays packets which are transmitted through the second external communication network 17 in the direction of increasing the Y coordinate, the third node 13 relays packets which are transmitted through the third external communication network 18 in the direction of decreasing the X coordinate, and the fourth node 14 relays packets which are transmitted through the fourth external communication network 19 in the direction of decreasing the Y coordinate. In addition, packets are transferred between the first to fourth nodes 11, 12, 13, and 14 through the internal communication network 15. When each packet reaches a node designated by the destination address, the processor in the node processes the packet.

Therefore, according to the present invention, it is possible to reduce the average number of operations of relaying a packet in the lattice-like interconnection network. In addition, since the processing for relaying packets can be equally distributed over the plurality of nodes, it is possible to prevent the lowering of the computing performance, which is caused by traffic concentration in a specific node or link. Further, since the plurality of nodes can have uniform constructions, it is possible to simplify the circuitry for realizing each computer cluster.

For example, if the sixteen nodes in FIG. 1 (i.e., the first to fourth nodes 11, 12, 13, and 14 in the computer cluster 10, the first to fourth nodes 21, 22, 23, and 24 in the computer cluster 20, the first to fourth nodes 31, 32, 33, and 34 in the computer cluster 30, and the first to fourth nodes 41, 42, 43, and 44 in the computer cluster 40) are respectively arranged in sixteen lattice points in a two-dimensional single-layer lattice with the dimensions of 4×4, transmission of a packet from the node 11 to the node 43 needs six operations of relaying the packet. However, in the interconnection network according to the present invention in which four computer clusters each containing four nodes are respectively arranged in four lattice points as illustrated in FIG. 1, transmission of a packet from the node 11 to the node 43 is performed through the nodes 11, 21, 22, and 42, i.e., the transmission of a packet from the node 11 to the node 43 needs only four operations of relaying the packet.

First Embodiment

First, the first embodiment of the present invention is explained below.

Figure 2:
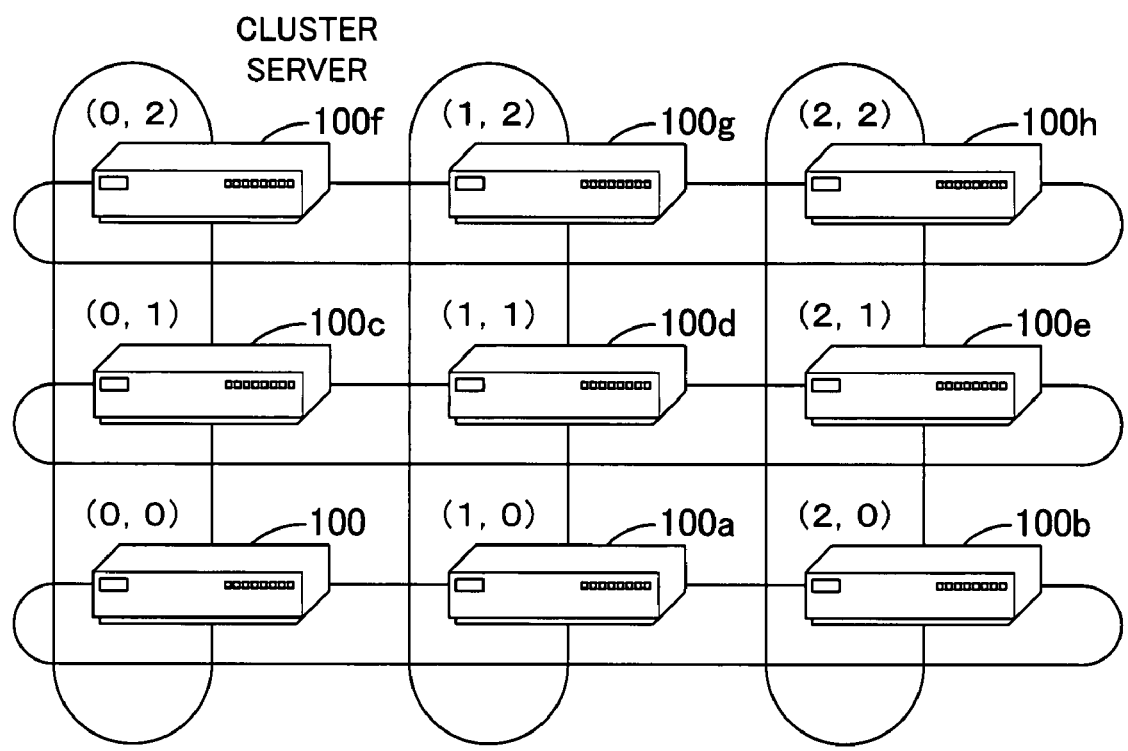
FIG. 2 is a diagram illustrating an exemplary configuration of a parallel processing system according to a first embodiment of the present invention.

FIG. 2 is a diagram illustrating an exemplary configuration of a parallel processing system according to the first embodiment of the present invention. In the parallel processing system of FIG. 2, a cluster server having a plurality of processing units is arranged at each of a plurality of lattice points in an interconnection network having a two-dimensional torus structure. The parallel processing system of FIG. 2 comprises nine cluster servers 100, 100a, 100b, 100c, 100d, 100e, 100f, 100g, and 100h, which are respectively located at the lattice points with the coordinates (0, 0), (1, 0), (2, 0), (0, 1), (1, 1), (2, 1), (0, 2), (1, 2), and (2, 2). As illustrated in FIG. 2, each of the cluster servers is connected through a bidirectional communication cable with each of four adjacent ones of the cluster servers respectively located on the greater X-coordinate side, the greater Y-coordinate side, the smaller X-coordinate side, and the smaller Y-coordinate side. In particular, the cluster servers at each pair of opposite lattice points in the matrix arrangement illustrated in FIG. 2 (which are located along a line parallel to the X or Y axis at opposite edges of the matrix arrangement) are connected so as to form the torus structure. Thus, it is possible to transmit packets between arbitrary cluster servers in FIG. 2.

For example, when a packet is transmitted from the cluster server 100d to the cluster server 100h, the packet is relayed by the cluster server 100e. In addition, when a packet is transmitted from the cluster server 100h to the cluster server 100, the packet is relayed by the cluster server 100f.

Figure 3:
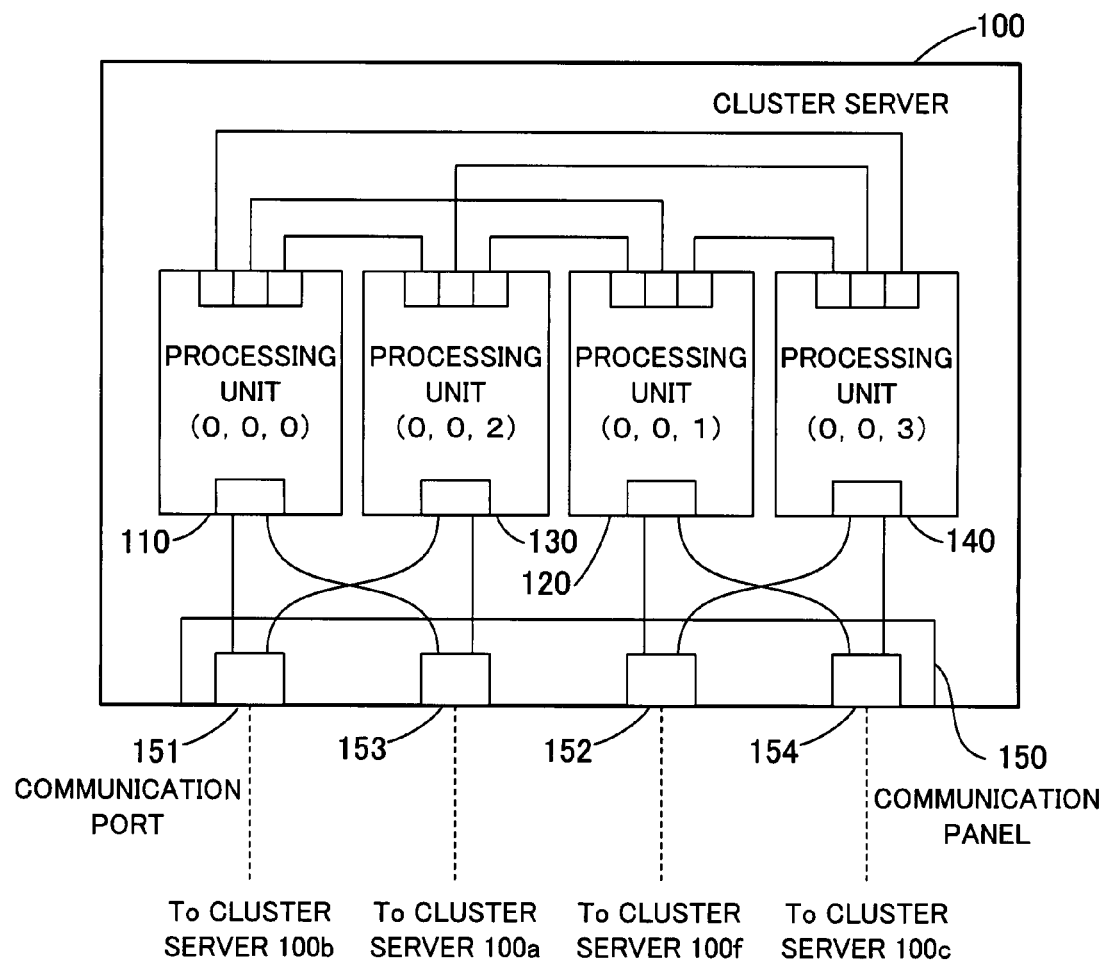
FIG. 3 is a diagram illustrating an exemplary construction of a cluster server according to the first embodiment of the present invention.

Next, the construction and the operations of the cluster server 100 are explained below. Since the cluster servers 100a, 100b, 100c, 100d, 100e, 100f, 100g, and 100h are similar to the cluster server 100, only the cluster server 100 is explained. FIG. 3 is a diagram illustrating an exemplary construction of the cluster server 100 in the parallel processing system of FIG. 2. As illustrated in FIG. 3, the cluster server 100 comprises processing units 110, 120, 130, and 140 and a communication panel 150.

Each of the processing units 110, 120, 130, and 140 is a device having the functions of data processing and switching of packets. An intracluster number indicating the relative position in the cluster server 100 is assigned to each of the processing units 110, 120, 130, and 140. Specifically, the intracluster numbers "0," "1," "2," and "3" are assigned to the processing units 110, 120, 130, and 140, respectively. The address uniquely identifying each of the processing units 110, 120, 130, and 140 is constituted by the coordinates of the lattice point at which the cluster server is located and the intracluster number of the processing unit. For example, the addresses (0, 0, 0), (0, 0, 1), (0, 0, 2), and (0, 0, 3) are assigned to the processing units 110, 120, 130, and 140, respectively.

The processing units 110, 120, 130, and 140 are connected to each other with six bidirectional communication cables. That is, each of the processing units 110, 120, 130, and 140 is directly connected to the other three processing units with three bidirectional communication cables. Thus, packets can be transmitted between arbitrary two processing units in the cluster server 100.

The communication panel 150 comprises communication ports 151, 152, 153, and 154, which are interfaces with which the communication cables are connected for communication with the other cluster servers. Specifically, a communication cable for communication with the cluster server 100b (located adjacent to the cluster server 100 on the smaller X-coordinate side) is connected with the communication port 151, a communication cable for communication with the cluster server 100a (located adjacent to the cluster server 100 on the greater X-coordinate side) is connected with the communication port 153, a communication cable for communication with the cluster server 100f (located adjacent to the cluster server 100 on the smaller Y-coordinate side) is connected with the communication port 152, and a communication cable for communication with the cluster server 100c (located adjacent to the cluster server 100 on the greater Y-coordinate side) is connected with the communication port 154.

Each of the communication ports 151, 152, 153, and 154 outputs to one of the processing units packets received through the communication cable connected with the communication port, and transmits packets acquired from one of the processing units, through the communication cable connected with the communication port.

Figure 4:
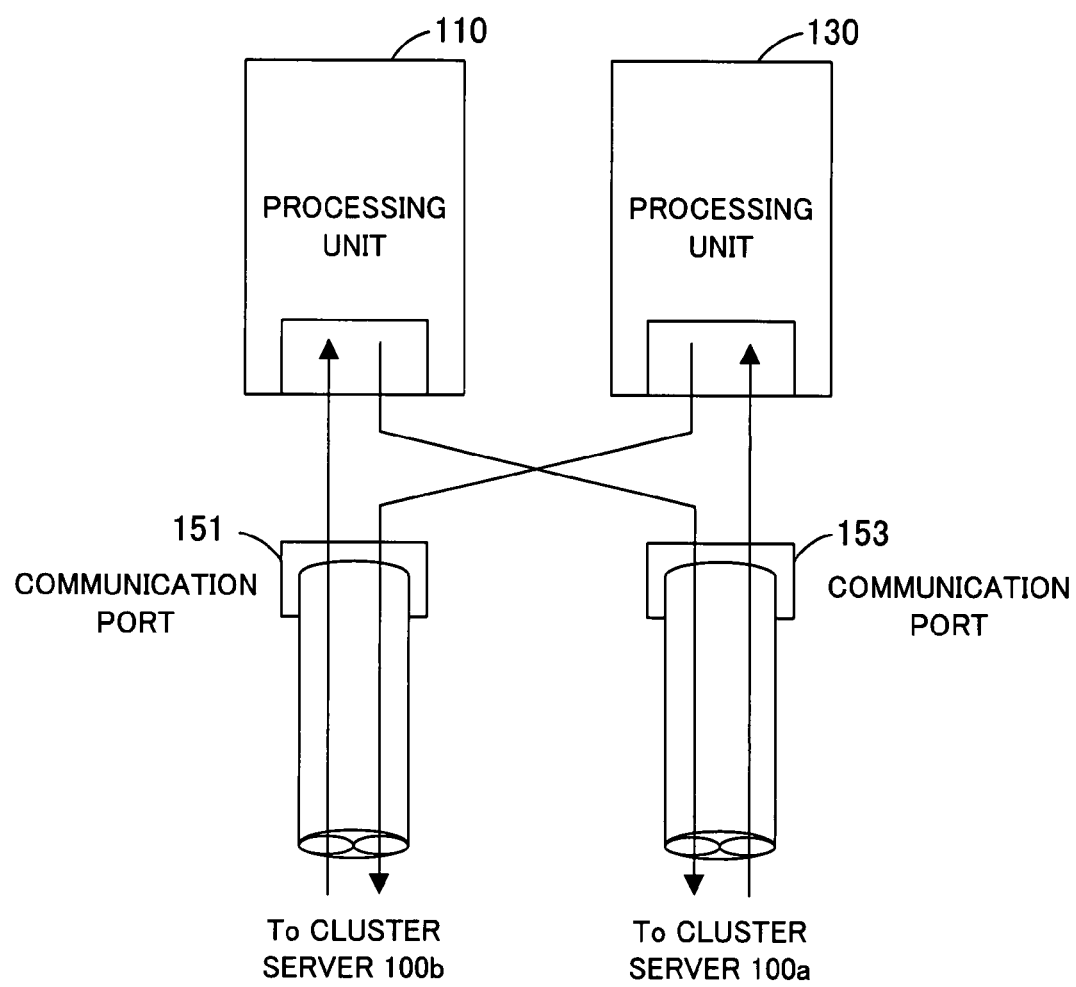
FIG. 4 is a diagram illustrating connections between communication cables and processing units in the cluster server through communication ports.

Specifically, the communication cable connected with each of the communication ports 151, 152, 153, and 154 is constituted by an upstream cable and a downstream cable. The upstream cable transmits packets to be inputted into the cluster server 100, and the downstream cable transmits packets outputted from the cluster server 100. FIG. 4 is a diagram illustrating connections between communication ports 151 and 153 and processing units 110 and 130 in the cluster server 100 through the communication cables. As illustrated in FIG. 4, the communication port 151 outputs to the processing unit 110 packets received through the upstream cable connected with the communication port 151, and transmits packets acquired from the processing unit 130, through the downstream cable connected with the communication port 151. In addition, the communication port 153 outputs to the processing unit 130 packets received through the upstream cable connected with the communication port 153, and transmits packets acquired from the processing unit 110, through the downstream cable connected with the communication port 153. Further, although not shown in FIG. 4, the communication port 152 outputs to the processing unit 120 packets received through the upstream cable connected with the communication port 152, and transmits packets acquired from the processing unit 140, through the downstream cable connected with the communication port 152, and the communication port 154 outputs to the processing unit 140 packets received through the upstream cable connected with the communication port 154, and transmits packets acquired from the processing unit 120, through the downstream cable connected with the communication port 154.

Since the upstream transmission paths and the downstream transmission paths are separated and the downstream transmission paths are crossed as illustrated in FIG. 4, it is possible to arrange the cluster servers so that each processing unit relays only the packets transmitted in a specific direction. That is, the processing unit 110 relays only the packets transmitted in the direction of increasing the X coordinate, the processing unit 120 relays only the packets transmitted in the direction of increasing the Y coordinate, the processing unit 130 relays only the packets transmitted in the direction of decreasing the X coordinate, and the processing unit 140 relays only the packets transmitted in the direction of decreasing the Y coordinate.

Figure 5:
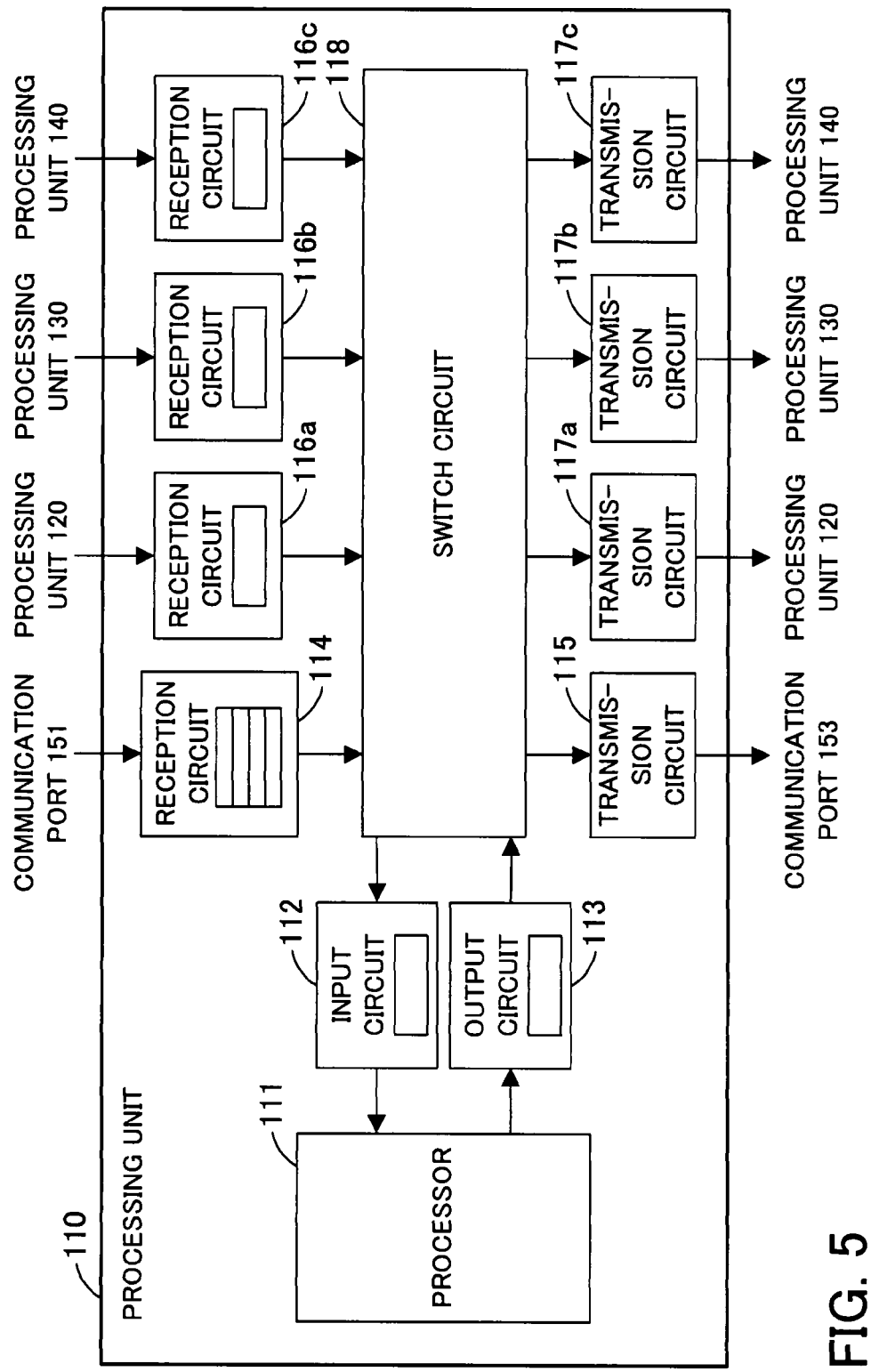
FIG. 5 is a diagram illustrating an example of a processing unit according to the first embodiment of the present invention.

Next, the construction and the operations of the processing unit 110 are explained below. Since the processing units 120, 130, and 140 are similar to the processing unit 110, only the processing unit 110 is explained. FIG. 5 is a diagram illustrating an example of the processing unit 110. As illustrated in FIG. 5, the processing unit 110 comprises a processor (or processing circuit) 111, an input circuit 112, an output circuit 113, reception circuits 114, 116a, 116b, and 116c, transmission circuits 115, 117a, 117b, and 117c, and a switch circuit 118.

The processor 111 successively acquires packets held in the input circuit 112, and performs data processing. In addition, when transmission of data to another processing unit is necessary, the processor 111 produces a packet containing the data and a destination address, and outputs the packet to the output circuit 113.

The input circuit 112 contains a FIFO (First In First Out) buffer memory. When the input circuit 112 acquires a packet from the switch circuit 118, the input circuit 112 stores the acquired packet at the tail end of a queue in the FIFO buffer memory. In addition, when the input circuit 112 receives a request from the processor 111, the input circuit 112 reads out a packet from the top of the queue in the FIFO buffer memory, and outputs the packet to the processor 111.

The output circuit 113 also contains a FIFO (First In First Out) type buffer memory. When the output circuit 113 acquires a packet from the processor 111, the output circuit 113 stores the acquired packet at the tail end of a queue in the internal FIFO buffer memory. In addition, when the output circuit 113 receives a request from the switch circuit 118, the output circuit 113 reads out a packet from the top of the queue in the FIFO buffer memory in the output circuit 113, and outputs the packet to the switch circuit 118.

The reception circuit 114 contains a plurality of FIFO (First In First Out) type buffer memories as virtual-channel buffers, and receives through the communication port 151 packets transmitted from the cluster server 10b. When the reception circuit 114 receives a packet, the reception circuit 114 selects one of the virtual-channel buffers on the basis of the destination address contained in the packet, and stores the acquired packet at the tail end of a queue in the virtual-channel buffer. In addition, when the reception circuit 114 receives a request from the switch circuit 118, the reception circuit 114 reads out a packet from the top of a queue in one of the virtual-channel buffers, and outputs the packet to the switch circuit 118. Thus, it is possible to set a plurality of virtual channels on the single transmission path.

Since the reception circuit 114 can set a plurality of virtual channels on the single transmission path, it is possible to prevent occurrence of deadlock. If the reception circuit in each processing unit in each cluster server has only one buffer memory, a deadlock occurs, for example, when the cluster server 100 (at the coordinates (0, 0)) transmits a packet to the cluster server 100a (at the coordinates (1, 0)), and the cluster server 100a (at the coordinates (1, 0)) transmits a packet to the cluster server 100d (at the coordinates (1, 1)), and the cluster server 100d (at the coordinates (1, 1)) transmits a packet to the cluster server 100c (at the coordinates (0, 1)), and the cluster server 100c (at the coordinates (0, 1)) transmits a packet to the cluster server 100 (at the coordinates (0, 0)), and all the buffer memories in the processing units used in the above transmissions are full. According to the present embodiment, the reception circuit 114 in the processing unit 100 is arranged so that a plurality of virtual channels can be set. Therefore, occurrence of deadlock can be prevented.

When the transmission circuit 115 acquires a packet from the switch circuit 118, the transmission circuit 115 outputs the acquired packet to the communication port 153, so that the packet can be transmitted to the cluster server 100a.

Each of the reception circuits 116a, 116b, and 116c contains a FIFO buffer memory. The reception circuit 116a acquires packets from the processing unit 120, the reception circuit 116b acquires packets from the processing unit 130, and the reception circuit 116c acquires packets from the processing unit 140. Each of the reception circuits 116a, 116b, and 116c stores the acquired packet at the tail end of a queue in the FIFO buffer memory. When each of the reception circuits 116a, 116b, and 116c receives a request from the switch circuit 118, the reception circuit reads out a packet from the top of the queue in the FIFO buffer memory, and outputs the packet to the switch circuit 118.

Each of the transmission circuits 117a, 117b, and 117c acquires packets from the switch circuit 118. The transmission circuit 117a outputs the acquired packet to the processing unit 120, the transmission circuit 117b outputs the acquired packet to the processing unit 130, and the transmission circuit 117c outputs the acquired packet to the processing unit 140.

The switch circuit 118 monitors the buffer memories in the output circuit 113 and the reception circuits 114, 116a, 116b, and 116c. When one or more packets are stored in the buffer memories in the output circuit 113 and the reception circuits 114, 116a, 116b, and 116c, the switch circuit 118 successively acquires the packets from the output circuit 113 and the reception circuits 114, 116a, 116b, and 116c. Then, the switch circuit 118 determines the destination (from the switch circuit 118) of each of the acquired packets on the basis of the destination address contained in the packet. The destination (from the switch circuit 118) of each of the acquired packets is one of the input circuit 112 and the transmission circuits 115, 117a, 117b, and 117c.

Next, the operations of the switch circuit 118 in the processing unit 110 are explained. FIG. 6 is a diagram indicating a rule for determining the destination from the switch circuit 118.

When the destination address of a packet to be outputted from the switch circuit 118 is the address of the processing unit 110, the switch circuit 118 determines whether or not the packet has been acquired from the output circuit 113. When yes is determined, the switch circuit 118 discards the packet. This is because transmission of a packet to the source of the packet is determined to be an error. On the other hand, when the destination address of the packet is the address of the processing unit 110 and the source of the packet is not the output circuit 113, the packet is outputted to the input circuit 112. When the destination address of the packet is the address of the processing unit 120, the switch circuit 118 outputs the packet to the transmission circuit 117a. When the destination address of the packet is the address of the processing unit 130, the switch circuit 118 outputs the packet to the transmission circuit 117b. When the destination address of the packet is the address of the processing unit 140, the switch circuit 118 outputs the packet to the transmission circuit 117c.

When the destination address of a packet to be outputted from the switch circuit 118 is different from the address of the processing unit 110 in the X coordinate, and the distance to the destination is reduced by transfer of the packet in the direction of increasing the X coordinate, the switch circuit 118 outputs the packet to the transmission circuit 115. When the destination address of the packet is different from the address of the processing unit 110 in the X coordinate, and the distance to the destination is reduced by transfer of the packet in the direction of decreasing the X coordinate, the switch circuit 118 outputs the packet to the transmission circuit 117b.

When the destination address of the packet and the address of the processing unit 110 are identical in the X coordinate, and the destination address of the packet and the address of the processing unit 110 are different in the Y coordinate, and the distance to the destination is reduced by transfer of the packet in the direction of increasing the Y coordinate, the switch circuit 118 outputs the packet to the transmission circuit 117a. When the destination address of the packet and the address of the processing unit 110 are identical in the X coordinate, and the destination address of the packet and the address of the processing unit 110 are different in the Y coordinate, and the distance to the destination is reduced by transfer of the packet in the direction of decreasing the Y coordinate, the switch circuit 118 outputs the packet to the transmission circuit 117c.

According to the rule indicated above, the transmission in the X direction consistently precedes the transmission in the Y direction for suppressing occurrence of deadlock. Alternatively, the switch circuits in the processing units 110, 120, 130, and 140 may be arranged so that the transmission in the Y direction consistently precedes the transmission in the X direction. Even in this case, similar effects can be obtained.

As explained above, in the parallel processing system according to the first embodiment, it is possible to reduce the number of operations of relaying a packet which are performed until the packet reaches a processing unit designated by the destination address. In addition, since the operations of transmitting packets in four directions in the two-dimensional coordinate space are equally distributed over the four processing units, it is possible to prevent traffic concentration in a specific circuit or communication cable. Further, since packets are directly transferred between the processing units in each cluster server through the all-to-all-connection network, it is unnecessary to provide virtual-channel buffers for preventing occurrence of deadlock in the transfer between the processing units in each cluster server, so that it is possible to suppress increase in the circuit size. Furthermore, it is possible to uniformize the constructions of the processing units, and simplify the circuitry for realizing each cluster server.

Second Embodiment

Next, the second embodiment of the present invention is explained below. The following explanations are focused on the differences from the first embodiment, and the explanations on the matters similar to the first embodiment are not indicated below.

Figure 7:
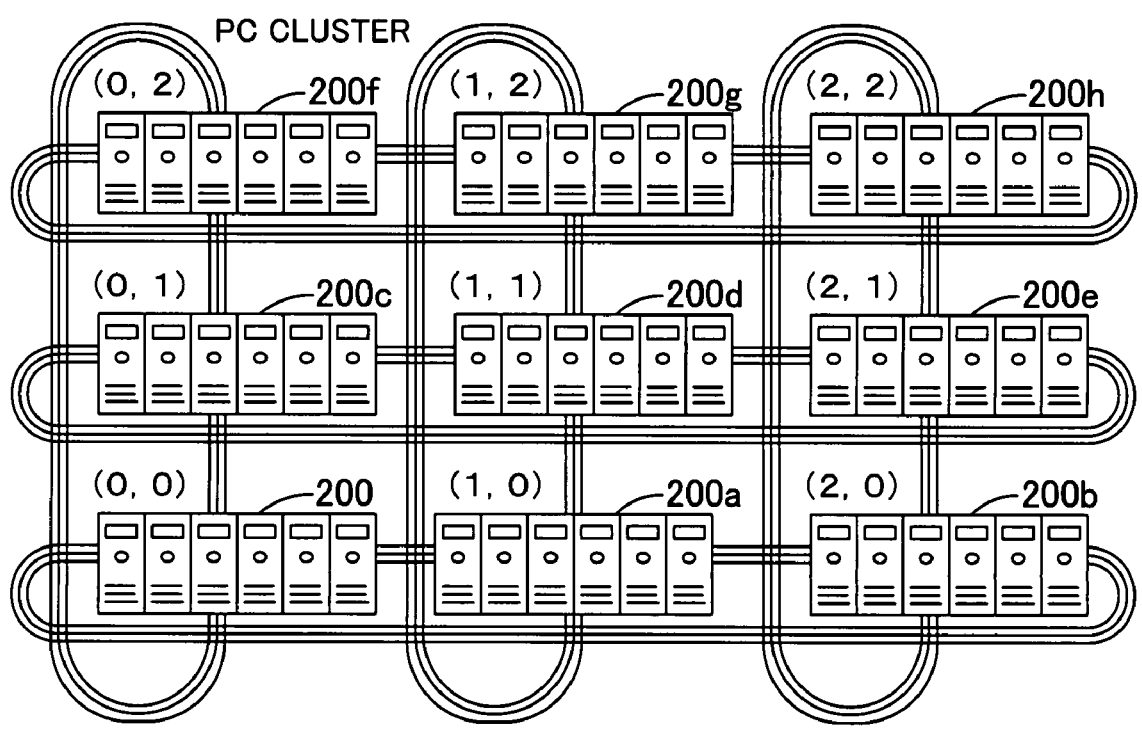
FIG. 7 is a diagram illustrating an exemplary configuration of a parallel processing system according to a second embodiment of the present invention.

FIG. 7 is a diagram illustrating an exemplary configuration of a parallel processing system according to the second embodiment of the present invention. In the parallel processing system of FIG. 7, a PC cluster having a plurality of PC servers is arranged at each of a plurality of lattice points in an interconnection network having a two-dimensional torus structure. The PC servers are personal computers, which are used as servers in the parallel processing system according to the second embodiment. The parallel processing system of FIG. 7 comprises nine PC clusters 200, 200a, 200b, 200c, 200d, 200e, 200f, 200g, and 200h, which are respectively located at the lattice points with the coordinates (0, 0), (1, 0), (2, 0), (0, 1), (1, 1), (2, 1), (0, 2), (1, 2), and (2, 2) As illustrated in FIG. 7, each of the PC clusters is connected through three bidirectional communication cables with each of four adjacent ones of the PC clusters respectively located on the greater X-coordinate side, the greater Y-coordinate side, the smaller X-coordinate side, and the smaller Y-coordinate side. In particular, the PC clusters located at each pair of opposite lattice points of the matrix arrangement illustrated in FIG. 7 (which are located along a line parallel to the X or Y axis at opposite edges of the matrix arrangement) are connected through three communication cables so as to form the torus structure.

Figure 8:
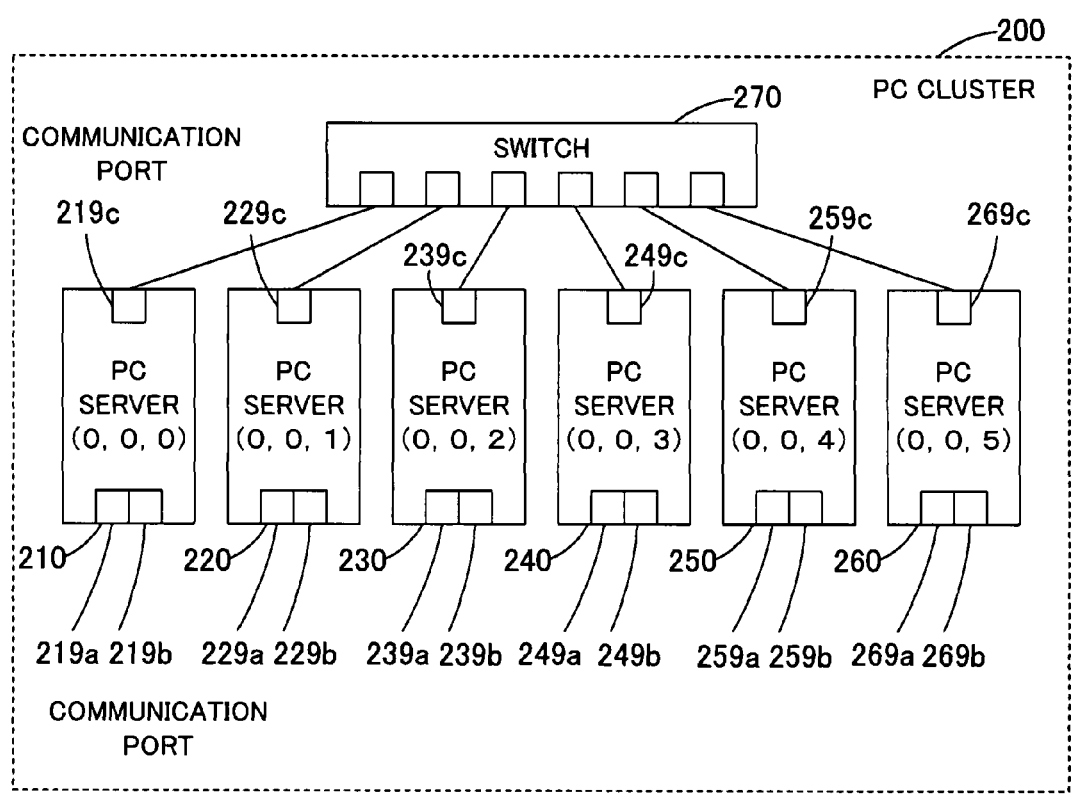
FIG. 8 is a diagram illustrating an exemplary construction of a PC cluster according to the second embodiment of the present invention.

Next, the constructions and operations of the PC cluster 200 are explained below. Since the PC clusters 200a, 200b, 200c, 200d, 200e, 200f, 200g, and 200h are similar to the PC cluster 200, only the PC cluster 200 is explained. FIG. 8 is a diagram illustrating an exemplary construction of the PC cluster 200 in the parallel processing system of FIG. 7. As illustrated in FIG. 8, the PC cluster 200 comprises PC servers 210, 220, 230, 240, 250, and 260 and a switch 270.

Each of the PC servers 210, 220, 230, 240, 250, and 260 is a device having the functions of data processing and switching of packets. An intracluster number indicating the relative position in the PC cluster 200 is assigned to each of the PC servers 210, 220, 230, 240, 250, and 260. Specifically, the intracluster numbers "0," "1," "2," "3," "4," and "5" are assigned to the PC servers 210, 220, 230, 240, 250, and 260, respectively. The address uniquely identifying each of the PC servers 210, 220, 230, 240, 250, and 260 is constituted by the intracluster number of the PC server and the coordinates of the lattice point at which the PC cluster is located. For example, the addresses (0, 0, 0), (0, 0, 1), (0, 0, 2), (0, 0, 3), (0, 0, 4), and (0, 0, 5) are assigned to the PC servers 210, 220, 230, 240, 250, and 260, respectively.

Each of the PC servers 210, 220, 230, 240, 250, and 260 has three communication ports. That is, the PC server 210 has communication ports 219a, 219b, and 219c, the PC server 220 has communication ports 229a, 229b, and 229c, the PC server 230 has communication ports 239a, 239b, and 239c, the PC server 240 has communication ports 249a, 249b, and 249c, the PC server 250 has communication ports 259a, 259b, and 259c, and the PC server 260 has communication ports 269a, 269b, and 269c.

A communication cable for communication with the switch 270 is connected with each of the communication ports 219c, 229c, 239c, 249c, 259c, and 269c. Each of the PC servers 210, 220, 230, 240, 250, and 260 outputs to the switch 270 a packet designating a PC server to which the packet is to be transferred, and then the switch 270 transfers the packet to the designated PC server.

A communication cable used in communication with a PC cluster other than the PC cluster 200 is connected with each of the communication ports 219a, 219b, 229a, 229b, 239a, 239b, 249a, 249b, 259a, 259b, 269a, and 269b.

Specifically, communication cables for communication with the PC servers in the PC cluster 200b (located adjacent to the PC cluster 200 on the smaller X-coordinate side) are connected with the communication ports 219a, 239a, and 259a, communication cables for communication with the PC servers in the PC cluster 200a (located adjacent to the PC cluster 200 on the greater X-coordinate side) are connected with the communication ports 219b, 239b, and 259b, communication cables for communication with the PC servers in the PC cluster 200f (located adjacent to the PC cluster 200 on the smaller Y-coordinate side) are connected with the communication ports 229a, 249a, and 269a, and communication cables for communication with the PC servers in the PC cluster 200c (located adjacent to the PC cluster 200 on the greater Y-coordinate side) are connected with the communication ports 229b, 249b, and 269b.

In the first embodiment, the upstream transmission paths and the downstream transmission paths are separated and the downstream transmission paths are crossed. On the other hand, in the second embodiment, only bidirectional communication cables are used in the connections between the constituents, and the crossing of the transmission paths is not used.

Figure 9:
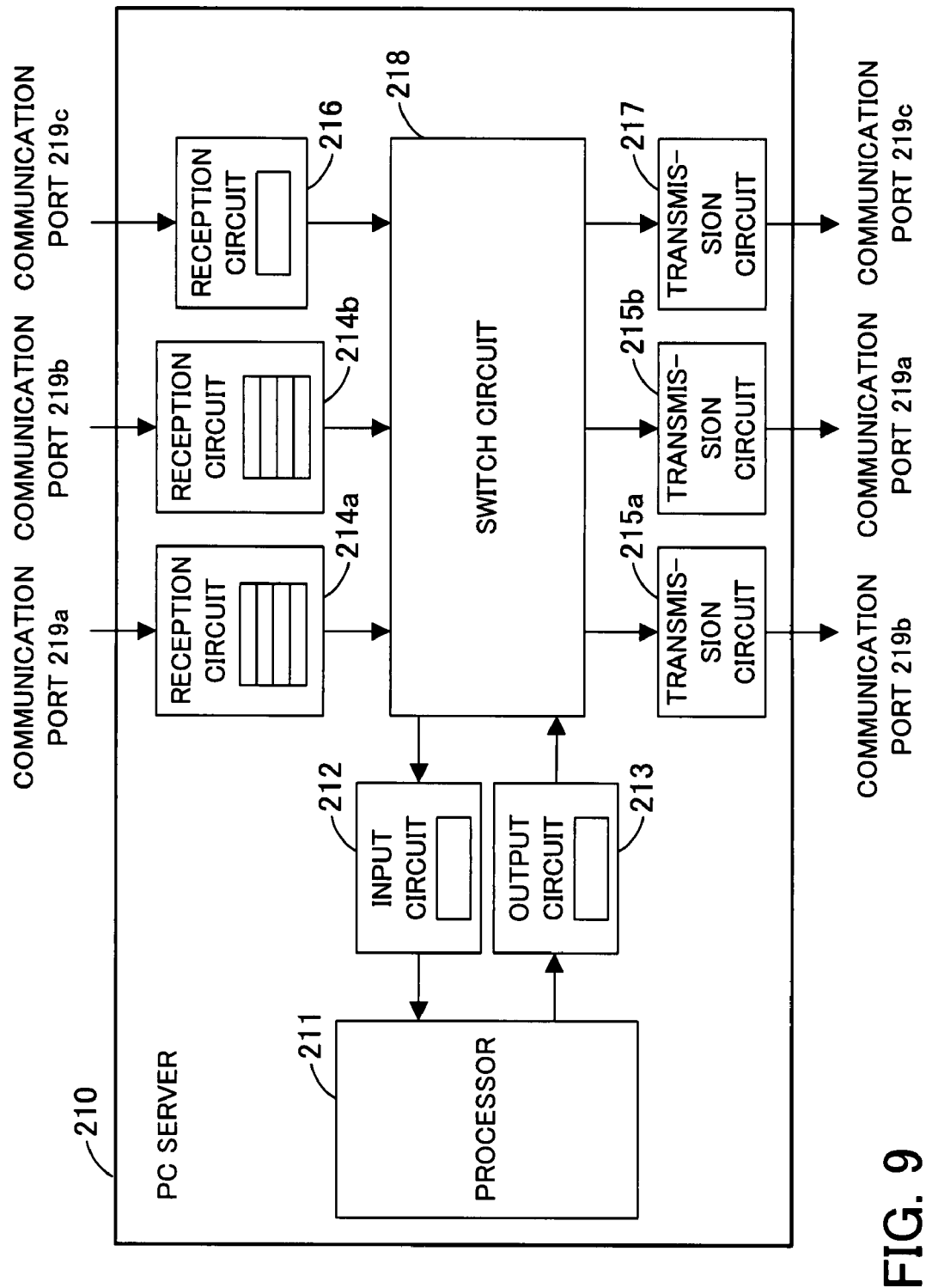
FIG. 9 is a diagram illustrating an exemplary construction of a PC server according to the second embodiment of the present invention.

Next, the constructions and operations of the PC server 210 are explained below. Since the PC servers 220, 230, 240, 250, and 260 are similar to the PC server 210, only the PC server 210 is explained. FIG. 9 is a diagram illustrating an example of the PC server 210. As illustrated in FIG. 9, the PC server 210 comprises a processor (or processing circuit) 211, an input circuit 212, an output circuit 213, reception circuits 214a, 214b, and 216, transmission circuits 215a, 215b, and 217, and a switch circuit 218.

The processor 211, the input circuit 212, and the output circuit 213 respectively have functions similar to the processor 111, the input circuit 112, and the output circuit 113 in the parallel processing system according to the first embodiment illustrated in FIG. 5.

Each of the reception circuits 214a and 214b contains a plurality of FIFO (First In First Out) type buffer memories as virtual-channel buffers. The reception circuit 214a receives through the communication port 219a packets transmitted from the cluster server 200b, and the reception circuit 214b receives through the communication port 219b packets transmitted from the cluster server 200a. In the PC server 210, a plurality of virtual channels can be realized by using the plurality of FIFO buffer memories in a similar manner to the processing unit 110 in the first embodiment.

When the transmission circuit 215a acquires a packet from the switch circuit 218, the transmission circuit 215a outputs the acquired packet to the communication port 219b, so that the packet can be transmitted to the PC cluster 200a. In addition, when the transmission circuit 215b acquires a packet from the switch circuit 218, the transmission circuit 215b outputs the acquired packet to the communication port 219a, so that the packet can be transmitted to the PC cluster 200b.

The reception circuit 216 contains a FIFO buffer memory. When the reception circuit 216 acquires through the communication port 219c a packet transferred from the switch 270, the reception circuit 216 stores the acquired packet at the tail end of a queue in the FIFO buffer memory.

The transmission circuit 217 acquires from the switch circuit 218 a packet in which a PC server as a destination is designated, and then outputs the acquired packet to the communication port 219c, so that the packet is transferred through the switch 270 to the designated PC server.

The switch circuit 218 monitors the buffer memories in the output circuit 213 and the reception circuits 214a, 214b, and 216. When one or more packets are stored in the buffer memories in the output circuit 213 and the reception circuits 214a, 214b, and 216, the switch circuit 218 successively acquires the packets from the output circuit 213 and the reception circuits 214a, 214b, and 216. Then, the switch circuit 218 determines the destination (from the switch circuit 218) of each of the acquired packets on the basis of the destination address contained in the packet. The destination (from the switch circuit 218) of each of the acquired packets is one of the input circuit 212 and the transmission circuits 215a, 215b, and 217.

Next, the operations of the switch circuit 218 in the PC server 210 are explained. FIG. 10 is a diagram indicating a rule for determining the destination from the switch circuit 218.

When the destination address of a packet to be outputted from the switch circuit 218 is the address of the PC server 210, the switch circuit 218 determines whether or not the packet has been acquired from the output circuit 213. When yes is determined, the switch circuit 218 discards the packet. This is because transmission of a packet to the source of the packet is determined to be an error. On the other hand, when the destination address of the packet is the address of the PC server 210 and the source of the packet is not the output circuit 213, the packet is outputted to the input circuit 212. When the destination address of the packet is the address of one of the PC servers 220, 230, 240, 250, and 260, the switch circuit 218 designates the PC server as the destination of the packet, and outputs the packet to the transmission circuit 217.

When the destination address of a packet to be outputted from the switch circuit 218 is different from the address of the PC server 210 in the X coordinate, and the distance to the destination is reduced by transfer of the packet in the direction of increasing the X coordinate, the switch circuit 218 outputs the packet to the transmission circuit 215a. When the destination address of the packet is different from the address of the PC server 210 in the X coordinate, and the distance to the destination is reduced by transfer of the packet in the direction of decreasing the X coordinate, the switch circuit 218 outputs the packet to the transmission circuit 215b.

When the destination address of the packet and the address of the PC server 210 are identical in the X coordinate, and the destination address of the packet and the address of the PC server 210 are different in the Y coordinate, the switch circuit 218 designates the PC server 220 as the destination of the packet, and outputs the packet to the transmission circuit 217.

The switch units in the PC servers 220, 230, 240, 250, and 260 also operate in similar manners to the switch circuit 218 in the PC server 210. In the switch units in the PC servers 220, 230, 240, 250, and 260, the destination addresses in the table illustrated in FIG. 10 should be appropriately replaced according to the intracluster numbers of the PC servers 220, 230, 240, 250, and 260.

According to the rule indicated above, the transmission in the X direction consistently precedes the transmission in the Y direction for suppressing occurrence of deadlock. Alternatively, the switch circuits in the PC servers 210, 220, 230, 240, 250, and 260 may be arranged so that the transmission in the Y direction consistently precedes the transmission in the X direction.

As explained above, in the parallel processing system according to the second embodiment, it is possible to reduce the number of operations of relaying a packet which are performed until the packet reaches a PC server designated by the destination address. In addition, since the operations of transmitting packets in four directions in the two-dimensional coordinate space are equally distributed over the six PC servers, it is possible to prevent traffic concentration in a specific circuit or communication cable. Further, since a plurality of PC servers are assigned to a single coordinate axis, it is possible to improve the packet transfer performance between the PC clusters. Furthermore, it is possible to uniformize the constructions of the PC servers, and simplify the circuitry for realizing each PC cluster. Moreover, since the switch 270 is used for transferring packets in each PC cluster, it is possible to reduce the number of the reception circuits and the transmission circuits in each PC server, and therefore to suppress increase in the circuit size.

Third Embodiment

Hereinbelow, the third embodiment of the present invention is explained below. The following explanations are focused on the differences from the first and second embodiments, and the explanations on the matters similar to the first and second embodiments are not indicated below.

Figure 11:
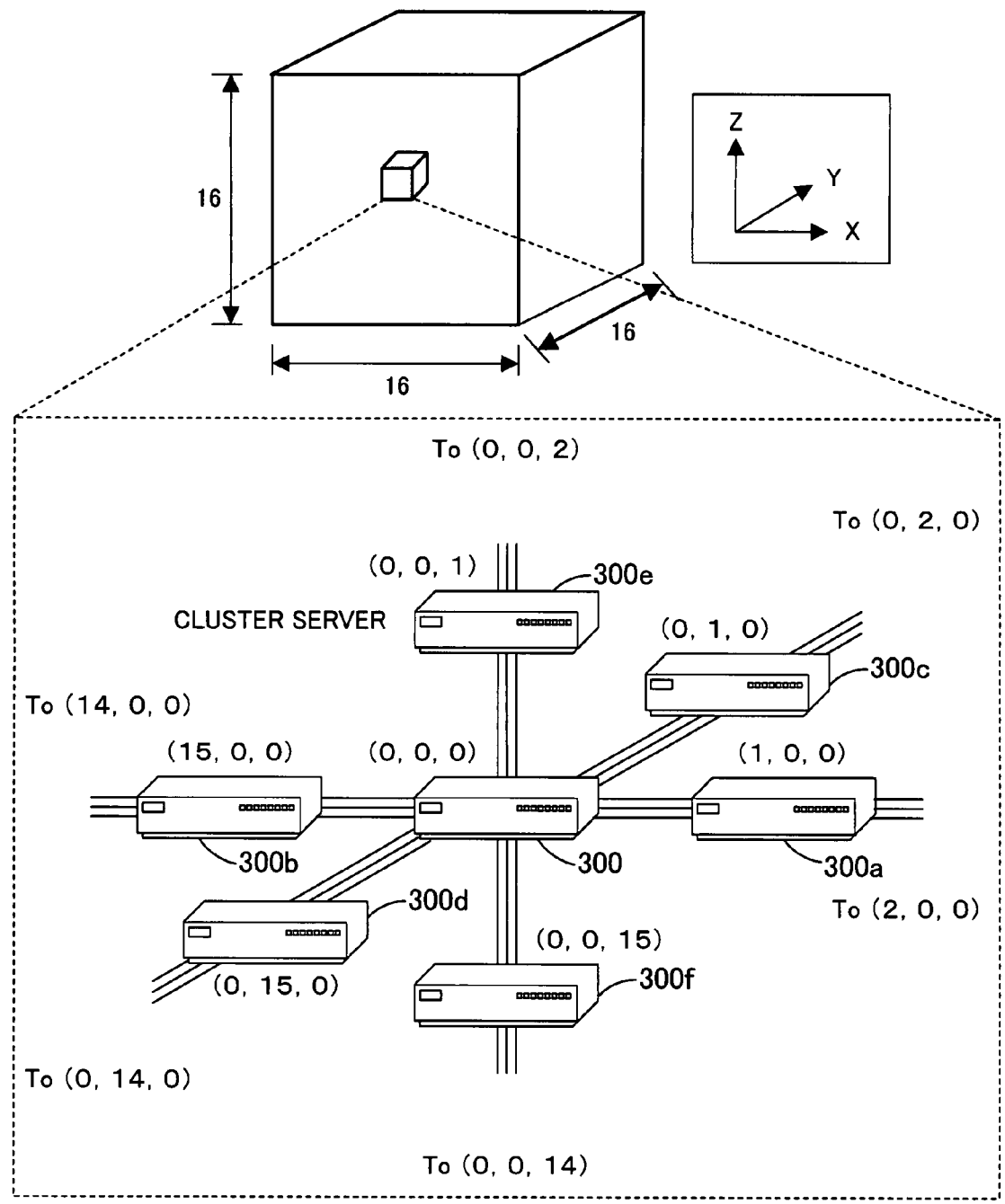
FIG. 11 is a diagram illustrating an exemplary configuration of a parallel processing system according to a third embodiment of the present invention.

FIG. 11 is a diagram illustrating an exemplary configuration of a parallel processing system according to the third embodiment of the present invention. In the parallel processing system of FIG. 11, a cluster server having a plurality of processing units is arranged at each of 16×16×16 lattice points in an interconnection network having a three-dimensional torus structure. In the dashed rectangle in FIG. 11, a portion of the parallel processing system containing a cluster server 300 and cluster servers 300a, 300b, 300c, 300d, 300e, and 300f adjacent to the cluster server 300 is illustrated.

In the parallel processing system of FIG. 11, for example, the cluster servers 300, 300a, 300b, 300c, 300d, 300e, and 300f are respectively located at the lattice points with the coordinates (0, 0, 0), (1, 0, 0), (15, 0, 0), (0, 1, 0), (0, 15, 0), (0, 0, 1), and (0, 0, 15). As illustrated in FIG. 11, each of the cluster servers is connected through three bidirectional communication cables with each of six adjacent ones of the cluster servers respectively located on the greater X-coordinate side, the greater Y-coordinate side, the greater Z-coordinate side, the smaller X-coordinate side, the smaller Y-coordinate side, and the smaller Z-coordinate side. In particular, the cluster servers located at each pair of opposite lattice points of the three-dimensional lattice arrangement illustrated in FIG. 11 (which are located along a line parallel to the X, Y, or Z axis at opposite edges of the three-dimensional lattice arrangement) are connected through three communication cables so as to form the three-dimensional torus structure.

Figure 12:
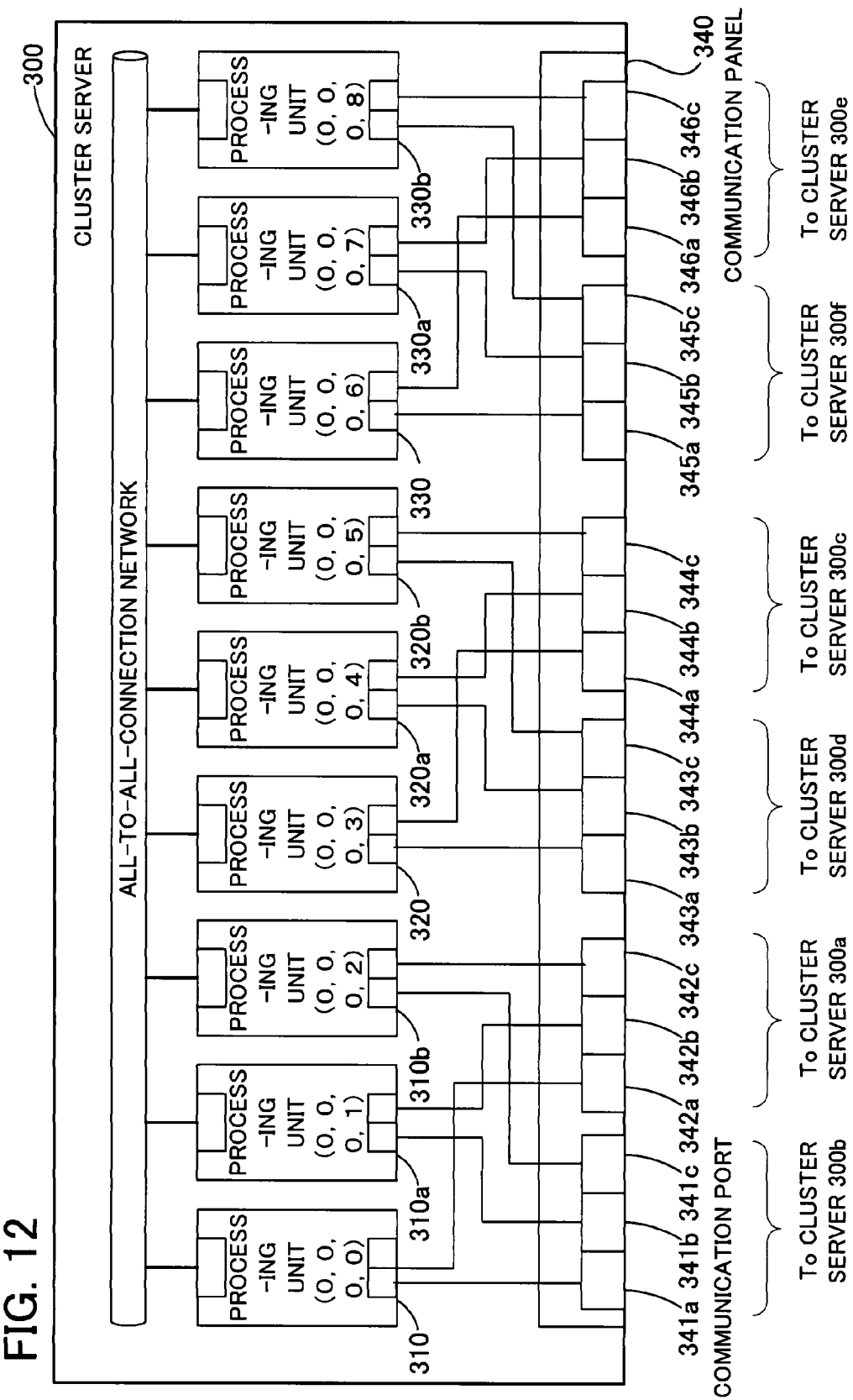
FIG. 12 is a diagram illustrating an exemplary construction of a cluster server according to the third embodiment of the present invention.

Next, the constructions and operations of the cluster server 300 are explained below. Since the cluster servers 300a, 300b, 300c, 300d, 300e, 300f, 300g, and 300h are similar to the cluster server 300, only the cluster server 300 is explained. FIG. 12 is a diagram illustrating an exemplary construction of the cluster server 300 in the parallel processing system of FIG. 11. As illustrated in FIG. 12, the cluster server 300 comprises processing units 310, 310a, 310b, 320, 320a, 320b, 330, 330a, and 330b and a communication panel 340.

Each of the processing units 310, 310a, 310b, 320, 320a, 320b, 330, 330a, and 330b is a device having the functions of data processing and switching of packets. An intracluster number indicating the relative position in the cluster server 300 is assigned to each of the processing units 310, 310a, 310b, 320, 320a, 320b, 330, 330a, and 330b. Specifically, the intracluster numbers "0," "1," "2," "3," "4," "5," "6," "7," and "8" are assigned to the processing units 310, 310a, 310b, 320, 320a, 320b, 330, 330a, and 330b, respectively. The address uniquely identifying each of the processing units 310, 310a, 310b, 320, 320a, 320b, 330, 330a, and 330b is constituted by the coordinates of the lattice point at which the cluster server is located and the intracluster number of the processing unit. For example, the addresses (0, 0, 0, 0), (0, 0, 0, 1), (0, 0, 0, 2), (0, 0, 0, 3), (0, 0, 0, 4), (0, 0, 0, 5), (0, 0, 0, 6), (0, 0, 0, 7), and (0, 0, 0, 8) are assigned to the processing units 310, 310a, 310b, 320, 320a, 320b, 330, 330a, and 330b, respectively.

Each of the nine processing units 310, 310a, 310b, 320, 320a, 320b, 330, 330a, and 330b is directly connected with all of the eight other processing units in the cluster server 300 through eight bidirectional communication cables so as to form an all-to-all-connection network.

The communication panel 340 comprises communication ports 341a, 341b, 341c, 342a, 342b, 342c, 343a, 343b, 343c, 344a, 344b, 344c, 345a, 345b, 345c, 346a, 346b, and 346c, to which communication cables for communication with the other cluster server 300a, 300b, 300c, 300d, 300e, 300f, 300g, and 300h are connected as indicated below.

(1) Communication cables for communication with the cluster server 300b (located adjacent to the cluster server 300 on the smaller X-coordinate side) are connected with the communication ports 341a, 341b, 341c, which are respectively connected to the processing units 310, 310a, and 310b in the cluster server 300, so that packets transmitted from the cluster server 300b can be inputted into the processing units 310, 310a, and 310b, and packets outputted from the processing units 310, 310a, and 310b can be transmitted to the cluster server 300b.

(2) Communication cables for communication with the cluster server 300a (located adjacent to the cluster server 300 on the greater X-coordinate side) are connected with the communication ports 342a, 342b, 342c, which are respectively connected to the processing units 310, 310a, and 310b in the cluster server 300, so that packets transmitted from the cluster server 300a can be inputted into the processing units 310, 310a, and 310b, and packets outputted from the processing units 310, 310a, and 310b can be transmitted to the cluster server 300a.

(3) Communication cables for communication with the cluster server 300d (located adjacent to the cluster server 300 on the smaller Y-coordinate side) are connected with the communication ports 343a, 343b, 343c, which are respectively connected to the processing units 320, 320a, and 320b in the cluster server 300, so that packets transmitted from the cluster server 300d can be inputted into the processing units 320, 320a, and 320b, and packets outputted from the processing units 320, 320a, and 320b can be transmitted to the cluster server 300d.

(4) Communication cables for communication with the cluster server 300c (located adjacent to the cluster server 300 on the greater Y-coordinate side) are connected to the communication ports 344a, 344b, 344c, which are respectively connected with the processing units 320, 320a, and 320b in the cluster server 300, so that packets transmitted from the cluster server 300c can be inputted into the processing units 320, 320a, and 320b, and packets outputted from the processing units 320, 320a, and 320b can be transmitted to the cluster server 300c.

(5) Communication cables for communication with the cluster server 300f (located adjacent to the cluster server 300 on the smaller Z-coordinate side) are connected with the communication ports 345a, 345b, 345c, which are respectively connected to the processing units 330, 330a, and 330b in the cluster server 300, so that packets transmitted from the cluster server 300f can be inputted into the processing units 330, 330a, and 330b, and packets outputted from the processing units 330, 330a, and 330b can be transmitted to the cluster server 300f.

(6) Communication cables for communication with the cluster server 300e (located adjacent to the cluster server 300 on the greater Z-coordinate side) are connected with the communication ports 346a, 346b, 346c, which are respectively connected to the processing units 330, 330a, and 330b in the cluster server 300, so that packets transmitted from the cluster server 300e can be inputted into the processing units 330, 330a, and 330b, and packets outputted from the processing units 330, 330a, and 330b can be transmitted to the cluster server 300e.

Figure 13:
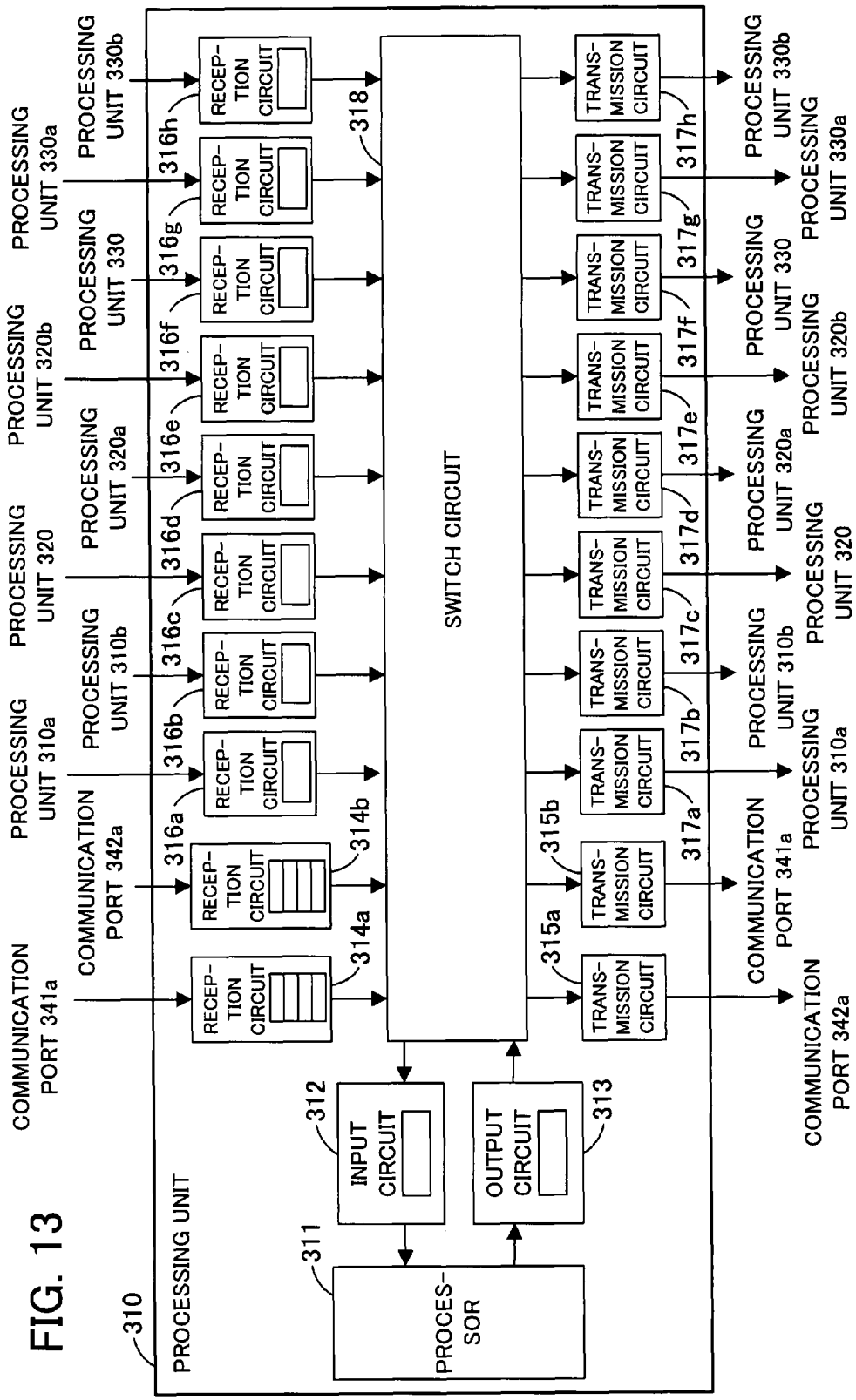
FIG. 13 is a diagram illustrating an example of a processing unit according to the third embodiment of the present invention.

Next, the constructions and operations of the processing unit 310 are explained below. Since the processing units 310a, 310b, 320, 320a, 320b, 330, 330a, and 330b are similar to the processing unit 310, only the processing unit 310 is explained. FIG. 13 is a diagram illustrating an example of the processing unit 310. As illustrated in FIG. 13, the processing unit 310 comprises a processor (or processing circuit) 311, an input circuit 312, an output circuit 313, reception circuits 314a, 314b, 316a, 316b, 316c, 316d, 316e, 316f, 316g, and 316h, transmission circuits 315a, 315b, 317a, 317b, 317c, 317d, 317e, 317f, 317g, and 317h, and a switch circuit 318.

The processor 311, the input circuit 312, and the output circuit 313 respectively have functions similar to the processor 111, the input circuit 112, and the output circuit 113 in the parallel processing system according to the first embodiment illustrated in FIG. 5.

Each of the reception circuits 314a and 314b contains a plurality of FIFO (First In First Out) type buffer memories as virtual-channel buffers. The reception circuit 314a receives through the communication port 341a packets transmitted from the cluster server 300b, and the reception circuit 314b receives through the communication port 342a packets transmitted from the cluster server 300a. In the processing unit 310, a plurality of virtual channels can be realized by using the plurality of FIFO buffer memories in a similar manner to the processing unit 110 in the first embodiment.

When the transmission circuit 315a acquires a packet from the switch circuit 318, the transmission circuit 315a outputs the acquired packet to the communication port 342a, so that the packet can be transmitted to the cluster server 300a. In addition, when the transmission circuit 315b acquires a packet from the switch circuit 318, the transmission circuit 315b outputs the acquired packet to the communication port 341a, so that the packet can be transmitted to the cluster server 300b.

Each of the reception circuits 316a, 316b, 316c, 316d, 316e, 316f, 316g, and 316h contains a FIFO buffer memory. The reception circuits 316a, 316b, 316c, 316d, 316e, 316f, 316g, and 316h acquire packets from the processing units 310a, 310b, 320, 320a, 320b, 330, 330a, and 330b, respectively. The transmission circuits 317a, 317b, 317c, 317d, 317e, 317f, 317g, and 317h acquire packets from the switch circuit 318, and output the acquired packets to the processing units 310a, 310b, 320, 320a, 320b, 330, 330a, and 330b, respectively.

The switch circuit 318 monitors the buffer memories in the output circuit 313 and the reception circuits 314a, 314b, 316a, 316b, 316c, 316d, 316e, 316f, 316g, and 316h. When one or more packets are stored in the buffer memories in the output circuit 313 and the reception circuits 314a, 314b, 316a, 316b, 316c, 316d, 316e, 316f, 316g, and 316h, the switch circuit 318 successively acquires the packets from the output circuit 313 and the reception circuits 314a, 314b, 316a, 316b, 316c, 316d, 316e, 316f, 316g, and 316h. Then, the switch circuit 318 determines the destination (from the switch circuit 318) of each of the acquired packets on the basis of the destination address contained in the packet. The destination (from the switch circuit 318) of each of the acquired packets is one of the input circuit 312 and the transmission circuits 315a, 315b, 317a, 317b, 317c, 317d, 317e, 317f, 317g, and 317h.

FIG. 14 is a diagram indicating a rule for determining the destination from the switch circuit 318. Since the switch units in the processing units 310, 310a, 310b, 320, 320a, 320b, 330, 330a, and 330b have similar constructions, the operations of only the switch circuit 318 in the processing unit 310 are explained below.

When the destination address of a packet to be outputted from the switch circuit 318 is the address of the processing unit 310, the switch circuit 318 determines whether or not the packet has been acquired from the output circuit 313. When yes is determined, the switch circuit 318 discards the packet. This is because transmission of a packet to the source of the packet is determined to be an error. On the other hand, when the destination address of the packet is the address of the processing unit 310 and the source of the packet is not the output circuit 313, the packet is outputted to the input circuit 312. When the destination address of the packet is the address of one of the processing units 310a, 310b, 320, 320a, 320b, 330, 330a, and 330b, the switch circuit 318 outputs the packet to one of the transmission circuits 317a, 317b, 317c, 317d, 317e, 317f, 317g, and 317h corresponding to the one of the processing units 310a, 310b, 320, 320a, 320b, 330, 330a, and 330b.

When the destination address of the packet is different from the address of the processing unit 310 in the X coordinate, and the distance to the destination is reduced by transfer of the packet in the direction of increasing the X coordinate, the switch circuit 318 outputs the packet to the transmission circuit 315a. When the destination address of the packet is different from the address of the processing unit 310 in the X coordinate, and the distance to the destination is reduced by transfer of the packet in the direction of decreasing the X coordinate, the switch circuit 318 outputs the packet to the transmission circuit 315b.

When the destination address of the packet and the address of the processing unit 310 are identical in the X coordinate, and the destination address of the packet and the address of the processing unit 310 are different in the Y coordinate, the switch circuit 318 outputs the packet to the transmission circuit 317c, so that the packet is transmitted to the processing unit 320. When the destination address of the packet and the address of the processing unit 310 are identical in the X and Y coordinates, and the destination address of the packet and the address of the processing unit 310 are different in the Z coordinate, the switch circuit 318 outputs the packet to the transmission circuit 317f, so that the packet is transmitted to the processing unit 330.

The switch units in the processing units 320, 330, 340, 350, and 360 also operate in similar manners to the switch circuit 318 in the processing unit 310. In the switch units in the processing units 320, 330, 340, 350, and 360, the destination addresses in the table illustrated in FIG. 14 should be appropriately replaced according to the intracluster numbers of the processing units 320, 330, 340, 350, and 360.

According to the rule indicated above, the transmission in the X direction consistently precedes the transmission in the Y direction, and the transmission in the Y direction consistently precedes the transmission in the Z direction. Alternatively, the priority order of the coordinate axes may be different.

As explained above, in the parallel processing system according to the third embodiment, it is possible to reduce the number of operations of relaying a packet which are performed until the packet reaches a processing unit designated by the destination address. In addition, since the operations of transmitting packets in six directions in the three-dimensional coordinate space are equally distributed over the nine processing units, it is possible to prevent traffic concentration in a specific circuit or communication cable. Further, since a plurality of processing units are assigned to a single coordinate axis, it is possible to improve the packet transfer performance between the cluster servers. Furthermore, since packets are directly transferred between the processing units in each cluster server through the all-to-all-connection network, it is unnecessary to provide virtual-channel buffers for preventing occurrence of deadlock in the transfer between the processing units in each cluster server, so that increase in the circuit size can be suppressed. Moreover, it is possible to uniformize the constructions of the processing units, and simplify the circuitry for realizing each cluster server.

Other Intracluster Network

As explained above, in each of the parallel processing systems according to the first and third embodiments, the all-to-all-connection network is used as a communication network through which packets are transferred in each cluster server. In the parallel processing system according to the second embodiment, a star-shaped-connection network is used as a communication network through which packets are transferred in each PC cluster. Further, a communication network having another structure may be used, for example, as indicated below.

Figure 15:
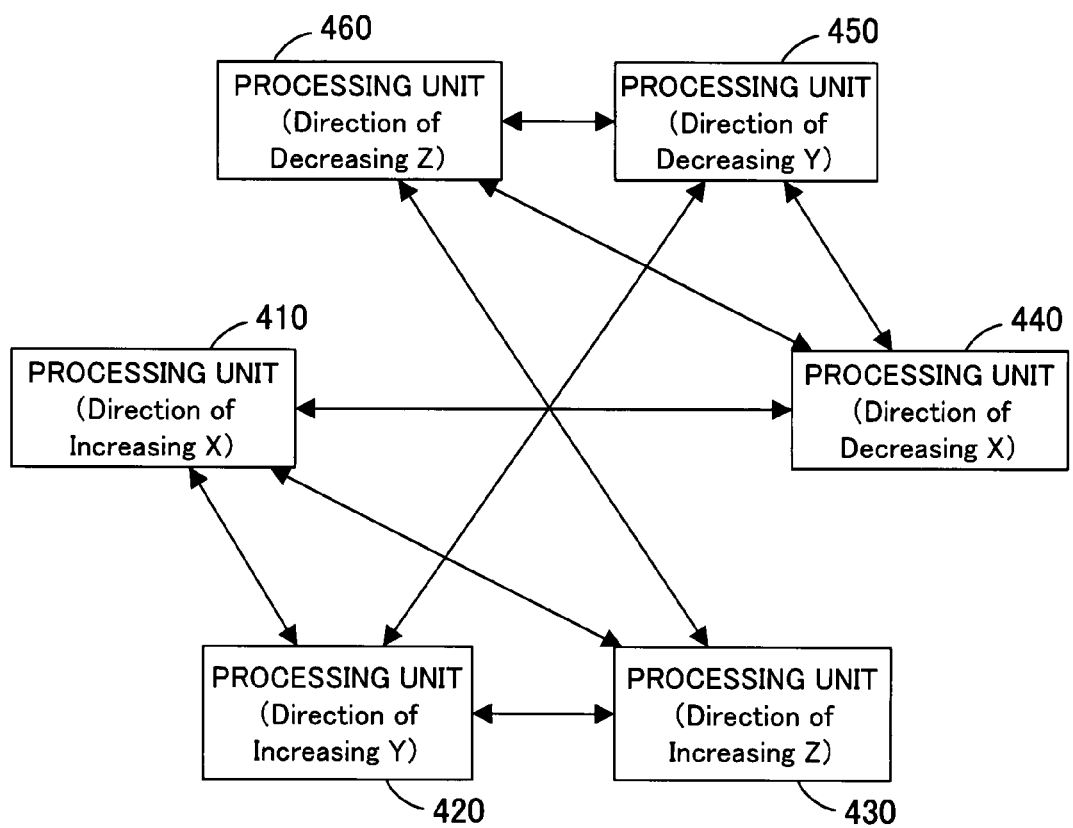
FIG. 15 is a schematic diagram illustrating an example of another communication network for transferring packets in a cluster.

FIG. 15 is a schematic diagram illustrating an example of another communication network for transferring packets in a cluster. A plurality of clusters each having the structure illustrated in FIG. 15 can be arranged at lattice points of an interconnection network having a three-dimensional torus structure. As illustrated in FIG. 15, each cluster has six processing units 410, 420, 430, 440, 450, and 460.

The processing unit 410 relays packets transmitted in the direction of increasing the X coordinate, the processing unit 420 relays packets transmitted in the direction of increasing the Y coordinate, the processing unit 430 relays packets transmitted in the direction of increasing the Z coordinate, the processing unit 440 relays packets transmitted in the direction of decreasing the X coordinate, the processing unit 450 relays packets transmitted in the direction of decreasing the Y coordinate, and the processing unit 460 relays packets transmitted in the direction of decreasing the Z coordinate.

In the cluster of FIG. 15, the processing units 410, 420, and 430 are interconnected through three communication cables, and the processing units 440, 450, and 460 are also interconnected through three communication cables. In addition, a communication cable is arranged between the processing units 410 and 440, between the processing units 420 and 450, and between the processing units 430 and 460.

As described above, the processing units 410, 420, and 430, which relay packets transmitted in increasing the X, Y, and Z coordinates, are interconnected, and the processing units 440, 450, and 460, which relay packets transmitted in decreasing the X, Y, and Z coordinates, are also interconnected, because it is considered that relay operations of packets transmitted in the directions of increasing the X, Y, and Z coordinates or relay operations of packets transmitted in the directions of increasing the X, Y, and Z coordinates are likely to be successively performed. Therefore, it is possible to suppress the average number of operations of relaying a packet in each cluster, and reduce the number of communication cables and the number of communication ports in each processing unit.

For example, in the case where six processing units are fully (all-to-all) interconnected, fifteen communication cables, and five communication ports for each processing unit are necessary. On the other hand, in the arrangement illustrated in FIG. 15, it is sufficient to arrange nine communication cables, and three communication ports for each processing unit.

Advantages

As explained above, according to the present invention, a computer cluster containing a plurality of nodes is arranged at each of a plurality of lattice points in an interconnection network, where two nodes can transmit packets to adjacent computer clusters located along the X direction, and two other nodes can transmit packets to adjacent computer clusters located along the Y direction. Therefore, it is possible to reduce the average number of operations of relaying a packet in the lattice-like interconnection network. In addition, since the processing for relaying packets can be equally distributed over the plurality of nodes, it is possible to prevent lowering of the computing performance, which is caused by traffic concentration in a specific node or link. Further, since the plurality of nodes can have uniform constructions, it is possible to simplify the circuitry for realizing each computer cluster.

Variations

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

In particular, it is possible to realize a computer cluster by using an arbitrary combination of two or more of the features (constructions) of the first to third embodiments of the present invention explained before.

What is claimed is:

1. A computer cluster for use as one of a plurality of components which are arranged at a plurality of lattice points in an interconnection network having a lattice-like structure, the interconnection network transmitting packets between the plurality of the lattice points, the computer cluster comprising:

first and third nodes each of which is connected to first and third components among the plurality of components, the first and third components including a plurality of nodes, the first and third components being located adjacent to the computer cluster along a direction parallel to a first axis;

second and fourth nodes each of which is connected to second and fourth components among the plurality of components, the second and fourth components including a plurality of nodes, the second and fourth components being located adjacent to the computer cluster along a direction parallel to a second axis; and an internal communication network to interconnect the first, second, third and fourth nodes;

wherein each of the first and third nodes is connected to the first and third components via routes bypassing the internal communication network, and each of the second and fourth nodes is connected to the second and fourth components via routes bypassing the internal communication network, each of the first and third nodes is connected to neither the second component nor the fourth component, and each of the second and fourth nodes is connected to neither the first component nor the third component, the first and third nodes, when receiving a packet to be transmitted to one of the second and fourth components, transfer the received packet to the second node or the fourth node through the internal communication network, and the second and fourth nodes, when receiving a packet to be transmitted to one of the first and third components, transfer the received packet to the first node or the third node through the internal communication network.

2. The computer cluster according to claim 1, wherein the internal communication network is an all-to-all-connection network to interconnect the first, second, third, and fourth nodes with each other through a bidirectional link.

3. The computer cluster according to claim 1, the internal communication network comprising:

a switch to receive packets and deliver the received packets to the first, second, third, and fourth nodes, and bidirectional links to connect the switch with the first, second, third, and fourth nodes respectively.

4. The computer cluster according to claim 1, wherein:

the first node is connected to the first component through a unidirectional link from the first component to the first node, and is connected to the third component through a unidirectional link from the first node to the third component, the third node is connected to the first component through a unidirectional link from the third node to the first component, and is connected to the third component through a unidirectional link from the third component to the third node, the second node is connected to the second component through a unidirectional link from the second component to the second node, and is connected to the fourth component through a unidirectional link from the second node to the fourth component, and the fourth node is connected to the second component through a unidirectional link from the fourth node to the second component, and is connected to the fourth component through a unidirectional link from the fourth component to the fourth node.

5. The computer cluster according to claim 1, wherein:

each of the first and third nodes is connected to the first component through a first bidirectional link, and is connected to the third component through a second bidirectional link, and each of the second and fourth nodes is connected to the second component through a third bidirectional link, and is connected to the fourth component through a fourth bidirectional link.

6. The computer cluster according to claim 1, each of the first, second third and fourth nodes comprising:

a plurality of virtual-channel buffers to temporarily store packets, a receiver to receive packets, and deliver the received packets to the plurality of virtual-channel buffers according to destination addresses contained in the received packets, and a switch to acquire the received packets stored in the plurality of virtual-channel buffers and performs switching of the acquired packets.

7. The computer cluster according to claim 1, wherein:

the computer cluster further includes fifth and sixth nodes each of which is connected to fifth and sixth components among the plurality of components, the fifth and sixth components being located adjacent to the computer cluster along a direction parallel to a third axis, the internal communication network interconnects the first, second, third, fourth, fifth and sixth nodes, each of the fifth and sixth nodes is not connected to any one of the first, second, third and fourth components, the fifth and sixth nodes, when receiving a packet to be transmitted to one of the first and third components, transfer the received packet to the first node or the third node through the internal communication network, and the fifth and sixth nodes, when receiving a packet to be transmitted to one of the second and fourth components, transfer the received packet to the second node or the fourth node through the internal communication network.

* * * * *